(12) United States Patent
Kunitake et al.

(10) Patent No.: US 9,348,445 B2
(45) Date of Patent: May 24, 2016

(54) INFORMATION PROCESSING DEVICE, INFORMATION PROCESSING METHOD, AND INFORMATION PROCESSING PROGRAM

(71) Applicant: Panasonic Intellectual Property Corporation of America, Torrance, CA (US)

(72) Inventors: Yuji Kunitake, Kyoto (JP); Ryo Yokoyama, Kanagawa (JP); Kenji Shimizu, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 51 days.

(21) Appl. No.: 14/234,583

(22) PCT Filed: May 20, 2013

(86) PCT No.: PCT/JP2013/003176
§ 371 (c)(1),
(2) Date: Jan. 23, 2014

(87) PCT Pub. No.: WO2013/175751
PCT Pub. Date: Nov. 28, 2013

(65) Prior Publication Data
US 2014/0152606 A1  Jun. 5, 2014

(30) Foreign Application Priority Data

May 25, 2012  (JP) ................. 2012-119930

(51) Int. Cl.
*G06F 3/041* (2006.01)
*G06F 1/16* (2006.01)

(52) U.S. Cl.
CPC ............. *G06F 3/041* (2013.01); *G06F 1/162* (2013.01); *G06F 1/1641* (2013.01); *G06F 1/1647* (2013.01); *G06F 1/1692* (2013.01)

(58) Field of Classification Search
CPC ............. G09G 2300/02–2300/026; G06F 1/1615–1/165
USPC ........... 345/1.1–1.3, 3.1–3.4, 169; 455/575.1, 455/575.3, 575.4; 361/679.06, 679.07, 361/679.26–679.3
See application file for complete search history.

(56) References Cited

U.S. PATENT DOCUMENTS

| 6,373,006 | B1 | 4/2002 | Toki | |
| 2007/0085759 | A1* | 4/2007 | Lee | G06F 1/1616 345/1.1 |
| 2011/0187662 | A1 | 8/2011 | Lee et al. | |
| 2012/0054753 | A1 | 3/2012 | Nagasaka et al. | |
| 2012/0117495 | A1* | 5/2012 | Sirpal | G06F 1/1616 715/761 |

FOREIGN PATENT DOCUMENTS

| CN | 102742168 A | 10/2012 |
| JP | 2001-127855 A | 5/2001 |

(Continued)

OTHER PUBLICATIONS

International Search Report for Application No. PCT/JP2013/003176 dated Jul. 16, 2013.

*Primary Examiner* — Ilana Spar
*Assistant Examiner* — Jeffrey S Steinberg
(74) *Attorney, Agent, or Firm* — Pearne & Gordon LLP

(57) ABSTRACT

Provided are an information processing device, an information processing method, and an information processing program, which simply switch to a display method which a user desires. When an information processing device (100) in which two touch panels (40, 50) are rotatably connected by a hinge (30) is in a two-screen state, the current screen mode is switched to another screen mode by carrying out a re-fold operation which, via a prescribed angle within a prescribed time, returns the information processing device (100) to an original state.

13 Claims, 18 Drawing Sheets

(56) References Cited

FOREIGN PATENT DOCUMENTS

| | | | |
|---|---|---|---|
| JP | 2003-283621 A | 10/2003 |
| JP | 2005-020575 A | 1/2005 |
| JP | 2005-109970 A | 4/2005 |
| JP | 2007-104275 A | 4/2007 |
| JP | 2012-048322 A | 3/2012 |

* cited by examiner

FIG. 2

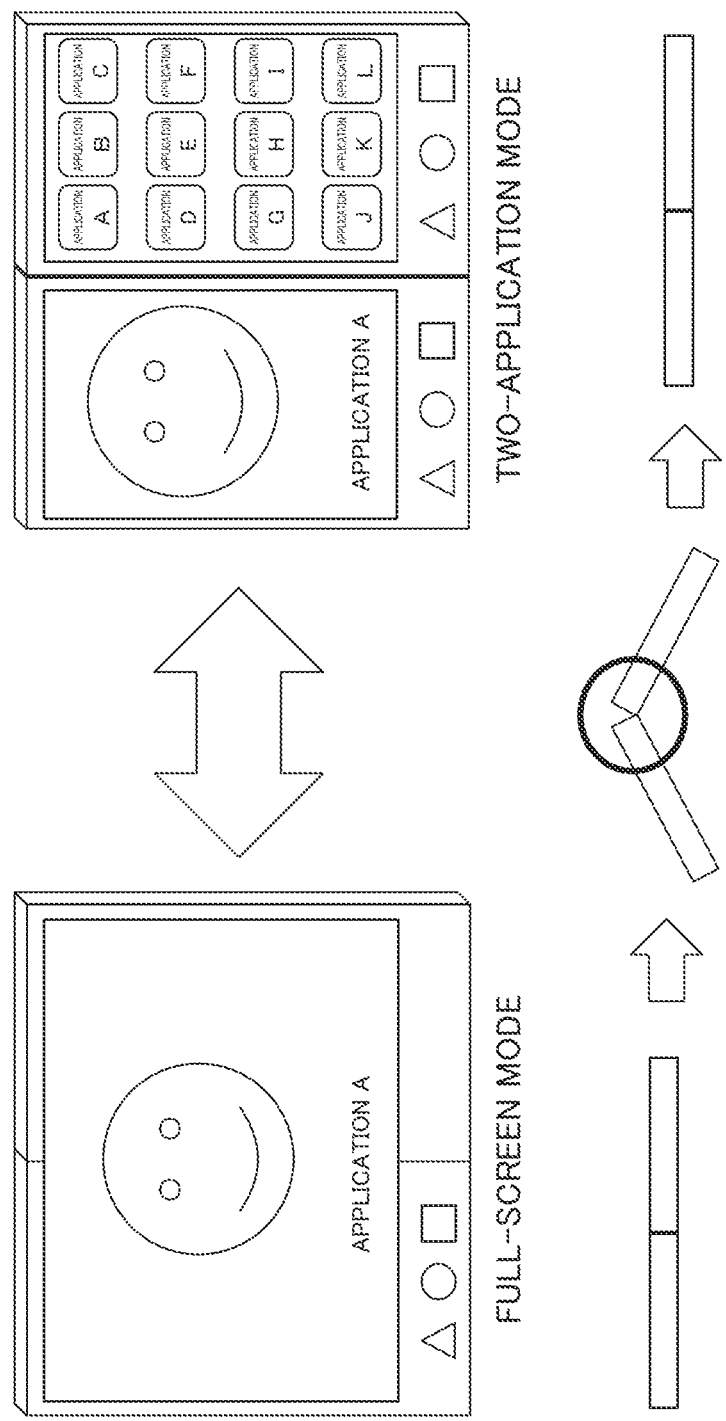

FIG. 6A
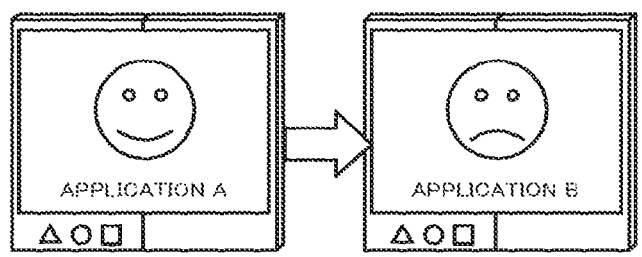
FIG. 6B
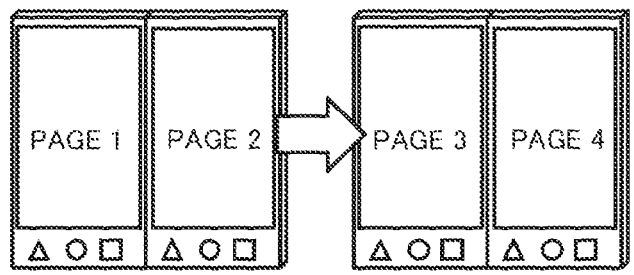
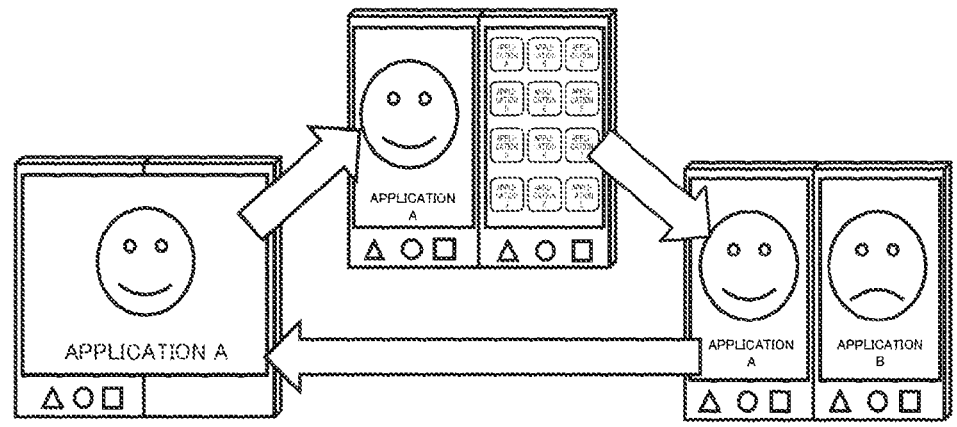
FIG. 6C
FIG. 6D
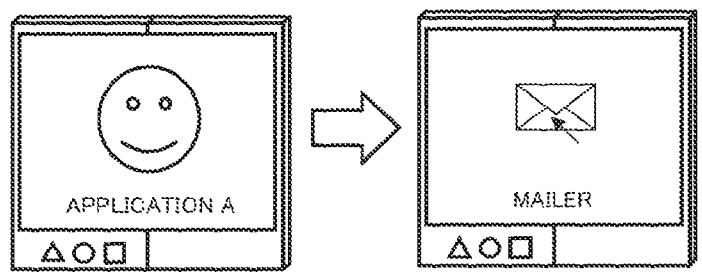

|              | APPLICATION A       | APPLICATION B       | APPLICATION C       | APPLICATION D       |
|--------------|---------------------|---------------------|---------------------|---------------------|
| APPLICATION A |                    | ONE HOUR<br>4 TIMES | THREE HOURS<br>5 TIMES | TWO HOURS<br>10 TIMES |
| APPLICATION B | ONE HOUR<br>4 TIMES |                     | TWO HOURS<br>15 TIMES | THREE HOURS<br>20 TIMES |
| APPLICATION C | THREE HOURS<br>5 TIMES | TWO HOURS<br>15 TIMES |                  | ONE HOUR<br>13 TIMES |
| APPLICATION D | TWO HOURS<br>10 TIMES | THREE HOURS<br>20 TIMES | ONE HOUR<br>13 TIMES |                |

FIG. 9

INFORMATION PROCESSING DEVICE, INFORMATION PROCESSING METHOD, AND INFORMATION PROCESSING PROGRAM

TECHNICAL FIELD

The present invention relates to an information processing apparatus in which two housings that respectively include display screens are rotatably connected to each other, and the present invention also relates to an information processing method and an information processing program.

BACKGROUND ART

In recent years, a terminal called a smart phone or a tablet has been widely used. As an example of such a terminal, there is a terminal including two touch panels (hereinafter, referred to as a "two-touch panel terminal").

The two-touch panel terminal has a configuration in which two housings that respectively include touch panels are connected to each other by a hinge or the like. A user may perform an opening/closing operation to open or close the two housings using a hinge as a shaft. The user may set the two touch panels in a desired state according to application by performing the opening/closing operation. For example, the user may switch between a first state and a second state. The first state refers to a state in which the two housings are horizontally arranged and two touch panels are placed in a row by the opening operation to open the two housings. The opening/closing operation is an example of a shape change operation to change the shape of the information processing apparatus.

Meanwhile, a typical terminal is provided with an operating system (OS) installed therein. The OS simultaneously starts a plurality of applications (hereinafter, referred to as "applications") and performs a plurality of processes in parallel. The user may perform a process such as preparing a document by a document preparation application while viewing information using an Internet browser, for example, using functions of such a terminal. Known techniques that simultaneously start a plurality of applications in this way include an information processing apparatus disclosed in PTL 1.

PTL 1 discloses generating simultaneous start group information indicating a plurality of applications which are started in the same time zone, on the basis of a start/end history of a plurality of applications, and generating simultaneous start group information indicating a specific application. Further, PTL 1 discloses starting, when the specific application is started, all applications included in the simultaneous start group that includes the started application, collectively, on the basis of the simultaneous start group. PTL 1 discloses the information processing apparatus that displays a group start button for collectively starting all the applications included in the simultaneous start group.

In the above-mentioned two-touch panel terminal, starting first and second applications, and displaying the first application on one touch panel and the second application on the other touch panel is possible.

CITATION LIST

Patent Literature

PTL 1
Japanese Patent Application Laid-Open No. 2012-48322

SUMMARY OF INVENTION

Technical Problem

However, in the two-touch panel terminal, various display methods other than displaying different applications respectively on two touch panels may be used. For example, two touch panels may be used as a display having a single large screen touch panel made of two touch panels. If the technique disclosed in PTL 1 is applied to the two-touch panel terminal, all the applications included in the simultaneous start group are collectively started when the specific application is started. However, in order to perform a display operation using a display method of user's choice, the user has to perform a cumbersome operation such as operating a touch panel.

An object of the invention is to provide an information processing apparatus, an information processing method and an information processing program capable of simply switching a display method to a display method of user's choice.

Solution to Problem

An information processing apparatus according to an aspect of the present invention is an information processing apparatus that includes a first housing having a first screen and a second housing having a second screen and that is allowed to switch between a first screen state and a second screen state by changing arrangement of the first housing and the second housing, the first housing and the second housing being rotatably connected to each other, the information processing apparatus including: a sensor that detects an angle formed by the first screen and the second screen; a shape determining section that determines a shape of the information processing apparatus based on the detected angle and determines whether or not a fold-and-return operation is performed, the fold-and-return operation being an operation in which a first angle formed by the first screen and the second screen in a two-screen state is changed to a predetermined second angle and then returned to the first angle within a predetermined time; a mode control section that switches a display method for performing a display operation in the first screen and the second screen to another display method when the fold-and-return operation is performed; and a display section that performs a display operation in the first screen and the second screen using the display method resulting from the switching performed by the mode control section.

An information processing method according to an aspect of the present invention is an information processing method in an information processing apparatus that includes a first housing having a first screen and a second housing having a second screen and that is allowed to switch between a first screen state and a second screen state by changing arrangement of the first housing and the second housing, the first housing and the second housing being rotatably connected to each other, the information processing method including: detecting an angle formed by the first screen and the second screen; determining a shape of the information processing apparatus based on the detected angle and determining whether or not a fold-and-return operation is performed, the fold-and-return operation being an operation in which a first angle formed by the first screen and the second screen in a two-screen state is changed to a predetermined second angle and then returned to the first angle within a predetermined time; switching a display method for performing a display operation in the first screen and the second screen to another display method when the fold-and-return operation is performed; and performing a display operation in the first screen and the second screen using the display method resulting from the switching.

An information processing program according to an aspect of the present invention is an information processing program that causes an information processing apparatus to execute processing, the information processing apparatus being an apparatus that includes a first housing having a first screen and a second housing having a second screen and that is allowed to switch between a first screen state and a second screen state by changing arrangement of the first housing and the second housing, the first housing and the second housing being rotatably connected to each other, the information processing program causing the apparatus to execute the processing including: detecting an angle formed by the first screen and the second screen; determining a shape of the information processing apparatus based on the detected angle and determining whether or not a fold-and-return operation is performed, the fold-and-return operation being an operation in which a first angle formed by the first screen and the second screen in a two-screen state is changed to a predetermined second angle and then returned to the first angle within a predetermined time; switching a display method for performing a display operation in the first screen and the second screen to another display method when the fold-and-return operation is performed; and performing a display operation in the first screen and the second screen using the display method resulting from the switching.

Advantageous Effects of Invention

According to the invention, it is possible to simply switch a display method to a display method of user's choice.

BRIEF DESCRIPTION OF DRAWINGS

FIG. 2 is a diagram for describing how a screen state is defined based on a display state of applications;

FIG. 5 is a diagram illustrating how a screen mode is switched by a fold-and-return operation;

FIGS. 6A to 6D are diagrams illustrating an example of how a display method is switched by the fold-and-return operation;

FIG. 9 is a diagram illustrating history information included in a simultaneous use history storage section shown in FIG. 7;

DESCRIPTION OF EMBODIMENTS

Figure 1:
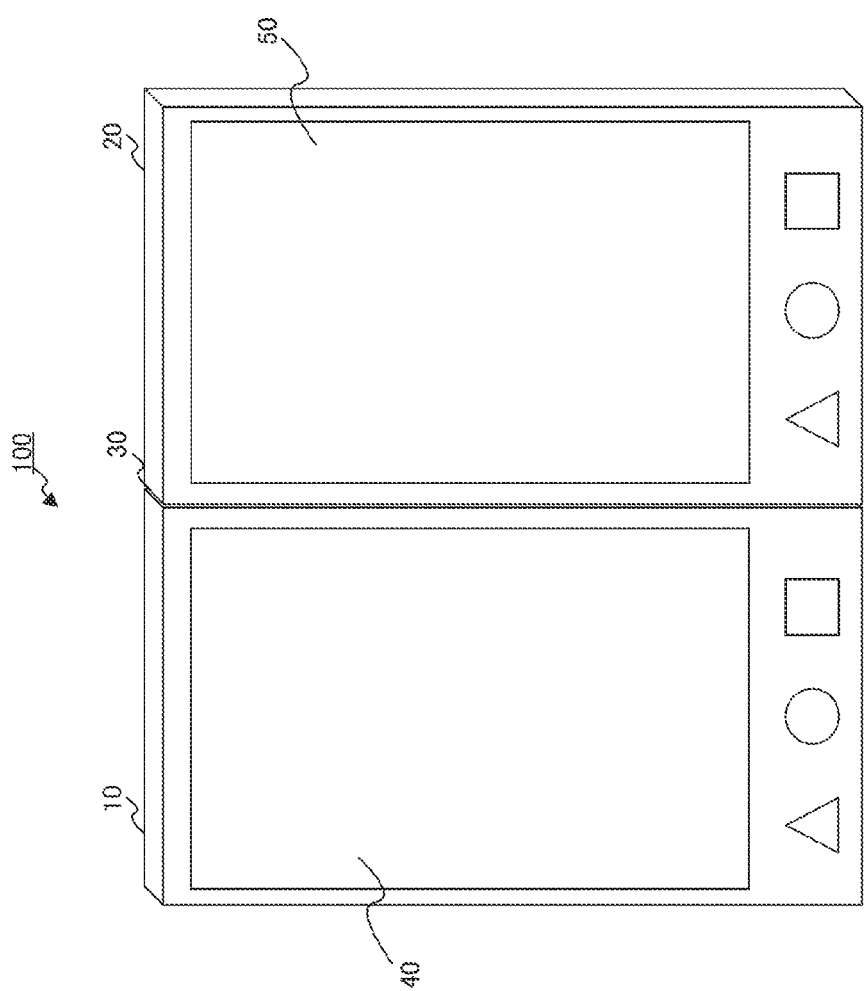
FIG. 1 is a diagram illustrating an appearance of an information processing apparatus according to Embodiment 1 of the present invention.

Hereinafter, embodiments of the invention will be described in detail with reference to the accompanying drawings. In the embodiments, the same reference numerals are given to components having the same functions, and repetitive description will be omitted.

Embodiment 1

Appearance of Information Processing Apparatus 100

FIG. 1 is a diagram illustrating an appearance of information processing apparatus 100 according to Embodiment 1 of the invention. A smart phone, a mobile phone, game machine, electronic dictionary, portable terminal, tablet or the like may be used as an application target of information processing apparatus 100.

In FIG. 1, information processing apparatus 100 includes housing 10 and housing 20. Housing 10 and housing 20 have flat plate shapes, respectively. Further, housing 10 and housing 20 are connected to each other via hinge 30. Further, housing 10 includes touch panel 40, and housing 20 includes touch panel 50.

In information processing apparatus 100, a user may perform an opening/closing operation to open or close housings 10 and 20 using hinge 30 as a shaft. By performing the opening/closing operation, the user may put together touch panels 40 and 50 in a folded state, or spread touch panels 40 and 50, as necessary. FIG. 1 illustrates the appearance in which touch panels 40 and 50 are in the spread state. In the spread state, the user may use two touch panels 40 and 50 as a single large screen touch panel. It is assumed that information processing apparatus 100 can be put into a folded state while the front surfaces of touch panel 40 and touch panel 50 face each other, or the rear surfaces of touch panel 40 and touch panel 50 face each other.

<Definition of Screen Mode>

As described above, information processing apparatus 100 may switch between the state where the rear surfaces of touch panels 40 and 50 are put together while facing each other (hereinafter, referred to a "first screen state") and the state where touch panels 40 and 50 are spread (hereinafter, referred to as a "second screen state"). That is, in the present embodiment, an information processing apparatus is capable of being switched between the first screen state and the second screen state by changing the arrangement of a first housing having a first screen and a second housing having a second screen.

Figure 2:
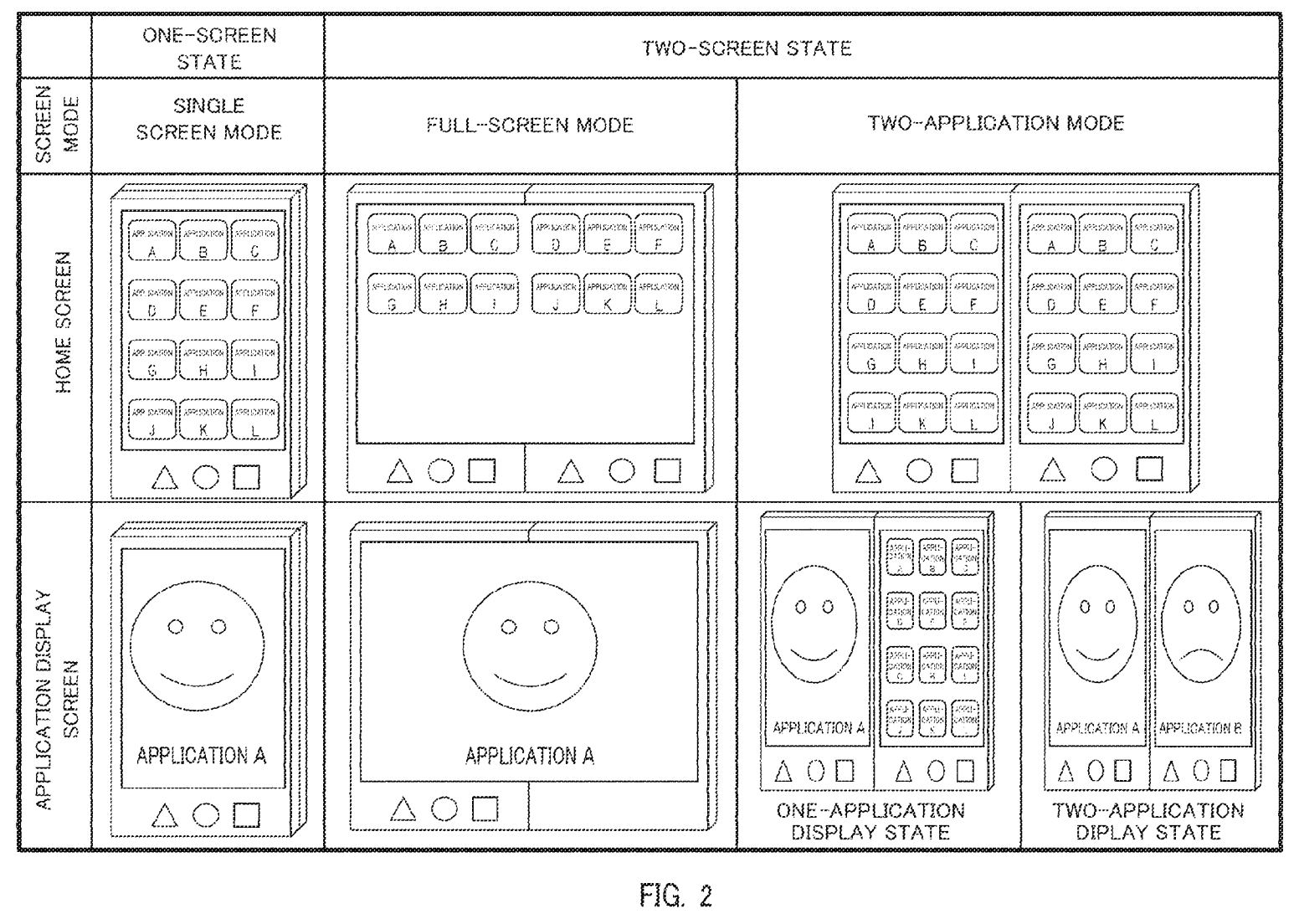

Here, a screen state based on an application display state shown in FIG. 2 is defined as a screen mode. In a one-screen state, a screen mode capable of starting and displaying one application on one screen is defined as a single screen mode. The single screen mode represents a state where only one of two touch panels is enabled by putting together the rear surfaces of the two touch panels while the rear surfaces face each other, for example. In a two-screen state, a screen mode capable of starting and displaying one application on the entirety of two screens is defined as a full-screen mode, and a screen mode capable of starting two applications on two-screens and displaying different applications on the respective screens is defined as a two-application mode.

Further, the single screen mode, full-screen mode and two-application mode each include a home screen on which no application is started, and an application display screen on which an application is started. Further, the application display screen of the two-application mode includes a one-application display state in which an application is displayed on only one of the two screens, and a two-application display state in which different applications are displayed on the respective screens.

<Configuration of Information Processing Apparatus 100>

Figure 3:
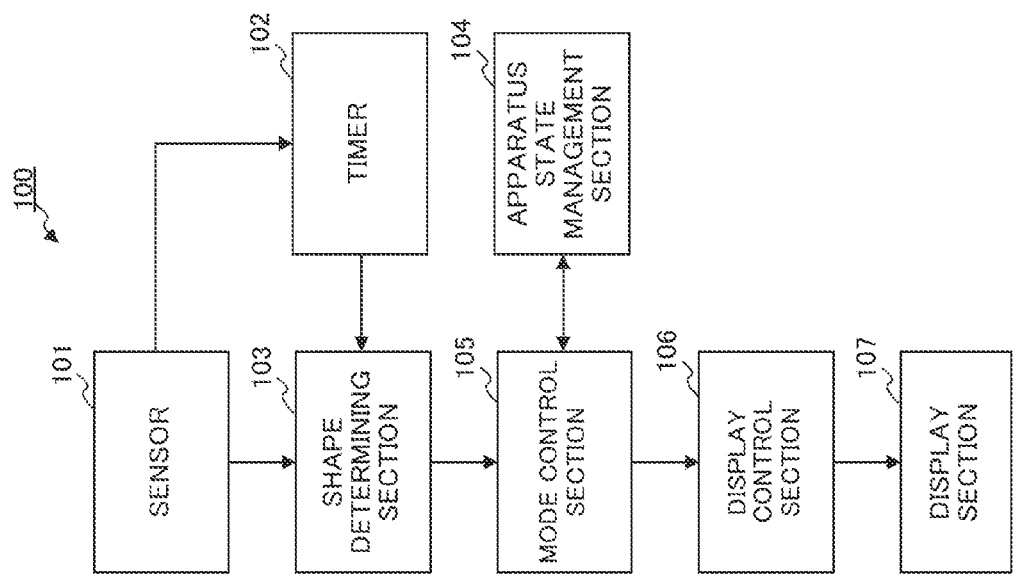
FIG. 3 is a block diagram illustrating a configuration of the information processing apparatus according to Embodiment 1 of the present invention.

FIG. 3 is a block diagram illustrating a configuration of information processing apparatus 100. Hereinafter, the configuration of information processing apparatus 100 will be described with reference to FIG. 3.

Information processing apparatus 100 of the present embodiment includes sensor 101, timer 102, shape determining section 103, apparatus state management section 104, mode control section 105, display control section 106, and display section 107.

Sensor 101 detects an angle formed by touch panel 40 and touch panel 50 with hinge 30 being a base point (hereinafter, simply referred to an "angle") and outputs the detected angle to timer 102 and shape determining section 103.

Timer 102 measures time from the time when sensor 101 detects the angle, and outputs the measured time to shape determining section 103.

Shape determining section 103 determines a shape change of information processing apparatus 100 on the basis of the angle output from sensor 101 and the time output from timer 102, and outputs the determination result to mode control section 105. As a specific example of the shape change, there is an operation in which the one-screen state at an angle of 360 degrees is switched to the two-screen state at an angle of 180 degrees, or an operation in which the angle of 180 degrees is changed to an angle of 210 degrees and then returned to the angle of 180 degrees within a predetermined time (hereinafter, this operation is referred to as a "fold-and-return operation").

Apparatus state management section 104 manages the current screen state, screen mode and the like output from mode control section 105.

Mode control section 105 instructs display control section 106 to switch the screen mode on the basis of the determination result of the shape change output from shape determining section 103, the current screen state and screen mode managed in apparatus state management section 104.

Display control section 106 generates a display screen to be displayed in the screen mode instructed from mode control section 105 and outputs the generated display screen to display section 107.

Display section 107 includes two screens, and displays the display screen output from display control section 106 on each screen.

<Operation of Information Processing Apparatus 100>

Figure 4:
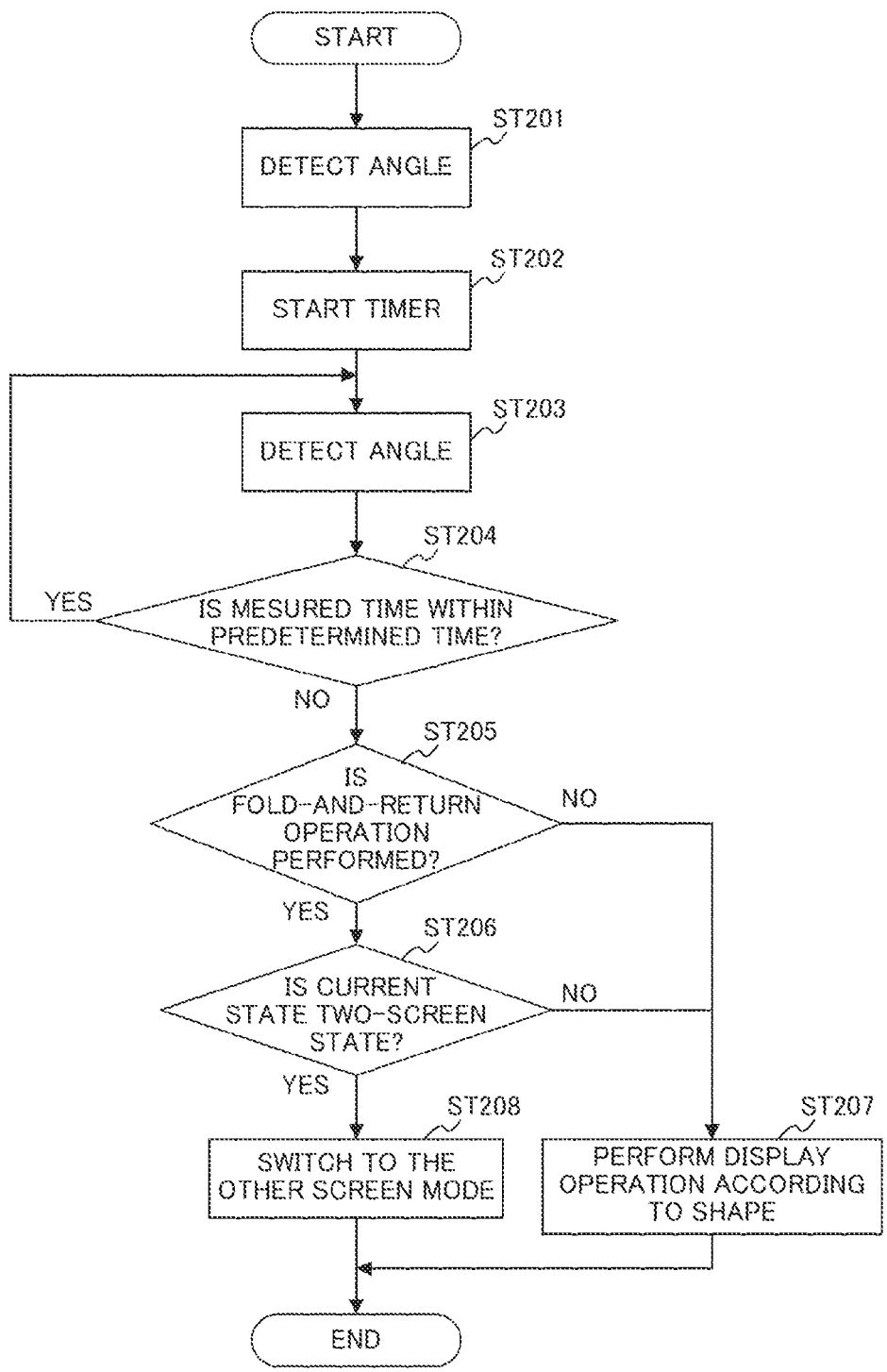
FIG. 4 is a flowchart illustrating an operation of the information processing apparatus shown in FIG. 3.

Next, an operation of information processing apparatus 100 mentioned above will be described with reference to FIG. 4. In FIG. 4, in step (hereinafter, referred to as "ST") 201, sensor 101 detects the angle, and in ST202, timer 102 starts the timer.

In ST203, sensor 101 detects the angle, and in ST204, shape determining section 103 determines whether the time measured by timer 102 is within a predetermined time. If the measured time is within the predetermined time (YES in ST204), the procedure returns to ST203, and if the measured time is not within the predetermined time (NO in ST204), the procedure goes to ST205.

In ST205, shape determining section 103 determines whether the fold-and-return operation is performed on the basis of the angle obtained by the sensor 101 for a predetermined time. If the fold-and-return operation is performed (YES in ST205), the procedure goes to ST206, and if the fold-and-return operation is not performed (NO in ST205), the procedure goes to ST207.

In ST206, mode control section 105 determines whether or not the current screen state is the two-screen state. If the current screen state is the two-screen state (YES in ST206), the procedure goes to ST208, and if the current screen state is not the two-screen state (NO in ST206), the procedure goes to ST207.

In ST207, mode control section 105 controls the screen mode according to the shape of information processing apparatus 100.

In ST208, mode control section 105 switches the current screen mode to the other screen mode. That is, if the current screen mode is the full-screen mode, mode control section 105 switches the full-screen mode to the two-application mode, and if the current screen mode is the two-application mode, mode control section 105 switches the two-application mode to the full-screen mode.

In this way, by performing the fold-and-return operation for information processing apparatus 100, it is possible to switch the current screen mode to the other screen mode (see FIG. 5).

In this way, according to Embodiment 1, when information processing apparatus 100 in which two touch panels 40 and 50 are rotatably connected to each other by hinge 30 is in the two-screen state, associating the switching of the screen mode with the fold-and-return operation for information processing apparatus 100 makes it possible to simply switch a display method to a display method of user's choice.

In the present embodiment, a case where the fold-and-return operation is performed from the two-screen state with the angle of 180 degrees has been described, but the present invention is not limited thereto. For example, the fold-and-return operation may be performed for the two-screen state at an angle of about 120 degrees to 150 degrees. In this case, for example, the angle of the two-screen state may be changed to an angle of 30 degrees or to an angle of 180 degrees and then returned to the original state. That is, the angle of information processing apparatus 100 in the two-screen state is changed and then returned to the original angle within a predetermined time.

Further, in the present embodiment, as the fold-and-return operation, a case where the angle of information processing apparatus 100 is changed from an angle of 180 degrees to an angle of 210 degrees and then returned to the angle of 180 degrees has been described, but the present invention is not limited thereto. For example, such an angle to be set as an angle to which the original angle is changed before being returned to the original angle may be other than the angle of 210 degrees (for example, 60 degrees, 270 degrees or the like), and a different display method may be associated with the set angle.

The following methods may be cited as the switching of the display method using the fold-and-return operation of information processing apparatus 100. In the full-screen mode, a method is possible that switches between a display state of information on application A that is started and a display state of information on application B that is currently in operation in the background by the fold-and-return operation (see FIG. 6A). Further, the fold-and-return operation may be used to perform screen shift of one application displayed in the full-screen mode (specifically, page turning of a viewer application as shown in FIG. 6B, for example).

Meanwhile, in the two-application mode, for example, the following operation may be employed in which switching is performed by the fold-and-return operation between display method A of displaying information on application A on the left display screen and displaying icons on the right display screen, display method B of displaying the information on application A on the left display screen and displaying information on application B on the right display screen, and display method C of displaying the icons on the left display screen and displaying icons different from the icons displayed on the left side on the right display screen.

Further, the full-screen mode display method and the two-application mode display method may be switched by the fold-and-return operation (see FIG. 6C).

Further, a specific application (application such as a mailer that is frequently used) may be started and displayed by the fold-and-return operation (see FIG. 6D).

When the display methods are switched in the manner described above, as long as one angle to which the original angle is changed before being returned to the original angle is set in the fold-and-return operation, performing the fold-and-return operation a plurality of times make it possible to perform switching to a desired display screen.

Further, if a plurality of angles to which the original angle is changed before being returned to the original angle are set in the fold-and-return operation, performing the fold-and-return operation to a corresponding one of the plurality of angles make it possible to perform switching to a desired display screen by performing the fold-and-return operation only a small number of times.

Embodiment 2

In Embodiment 2 of the invention, a case where applications with high simultaneous use-frequency are displayed in association will be described.

<Definition of Simultaneous Use>

In an OS (multitasking OS) capable of simultaneously starting a plurality of applications and executing a plurality of processes in parallel, there are a plurality of states of the applications. The states of the applications include a state of being displayed on a screen and being operable by a user, a state of not being displayed on a screen but being operated in the background, a state of not being terminated but being suspended, and the like.

In the two-touch panel terminal, a state where a user simultaneously uses applications refers to a state where two applications are displayed on respective screens and are operable in the two-application mode, and this state is defined as a simultaneous use state.

Here, in a state where one application is displayed in the two-application mode, if the second application is not displayed on the other screen but is operated in the background or in the suspended state, it is defined that the second application is not in the simultaneous use state.

<Configuration of Information Processing Apparatus 300>

Figure 7:
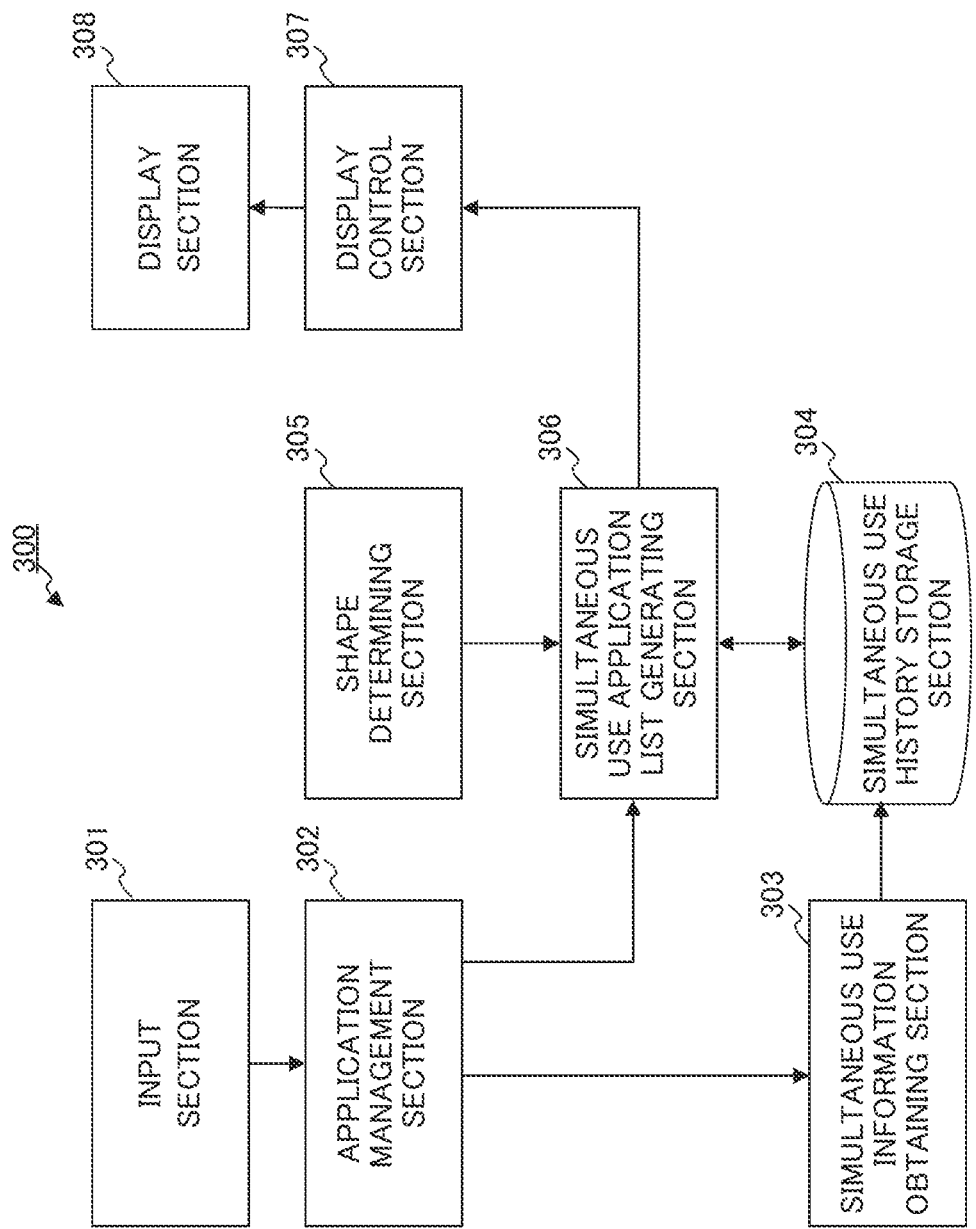
FIG. 7 is a block diagram illustrating a configuration of an information processing apparatus according to Embodiment 2 of the present invention.

FIG. 7 is a block diagram illustrating a configuration of information processing apparatus 300 according to Embodiment 2 of the invention. Hereinafter, the configuration of information processing apparatus 300 will be described with reference to FIG. 7.

Information processing apparatus 300 of the present embodiment includes input section 301, application management section 302, simultaneous use information obtaining section 303, simultaneous use history storage section 304, shape determining section 305, simultaneous use application list generating section 306, display control section 307, and display section 308.

Input section 301 obtains information input (input information) from a user using a touch panel, a physical key or the like, and outputs the obtained input information to application management section 302.

Application management section 302 controls start and end of an application by the input information output from input section 301, and outputs start information and end information on the application to simultaneous use application list generating section 306. Further, application management section 302 determines a display state of the application that is currently in operation (whether the display state is a state where two applications are simultaneously displayed) and a screen mode, and outputs the determination result to simultaneous use information obtaining section 303.

Simultaneous use information obtaining section 303 obtains combination information on applications that are simultaneously used and the use-frequency of the combination, on the basis of the start information and end information on the application output from application management section 302. Further, simultaneous use information obtaining section 303 outputs the obtained combination information and use-frequency to simultaneous use history storage section 304.

Simultaneous use history storage section 304 accumulates the combination information on applications and the use-frequency output from simultaneous use information obtaining section 303, and stores the accumulated information as application history information.

Shape determining section 305 determines the shape of information processing apparatus 300, that is, whether information processing apparatus 300 is in the one-screen state or in the two-screen state, and outputs the determination result to simultaneous use application list generating section 306 as shape information.

Simultaneous use application list generating section 306 reads the history information from simultaneous use history storage section 304, and obtains the read history information, the shape information output from shape determining section 305 and the information output from application management section 302. Further, simultaneous use application list generating section 306 generates information indicating a list of applications simultaneously used with the first application that is currently in operation (hereinafter, referred to as application list information), on the basis of the obtained history information, shape information and information from application management section 302. Further, simultaneous use application list generating section 306 outputs the generated application list information to display control section 307.

Display control section 307 generates a display screen for displaying the application list information output from simultaneous use application list generating section 306, and outputs the generated display screen to display section 308.

Display section 308 includes two screens, and displays the display screen output from display control section 307 on one of the two screens.

<History Information Generation Procedure>

Figure 8:
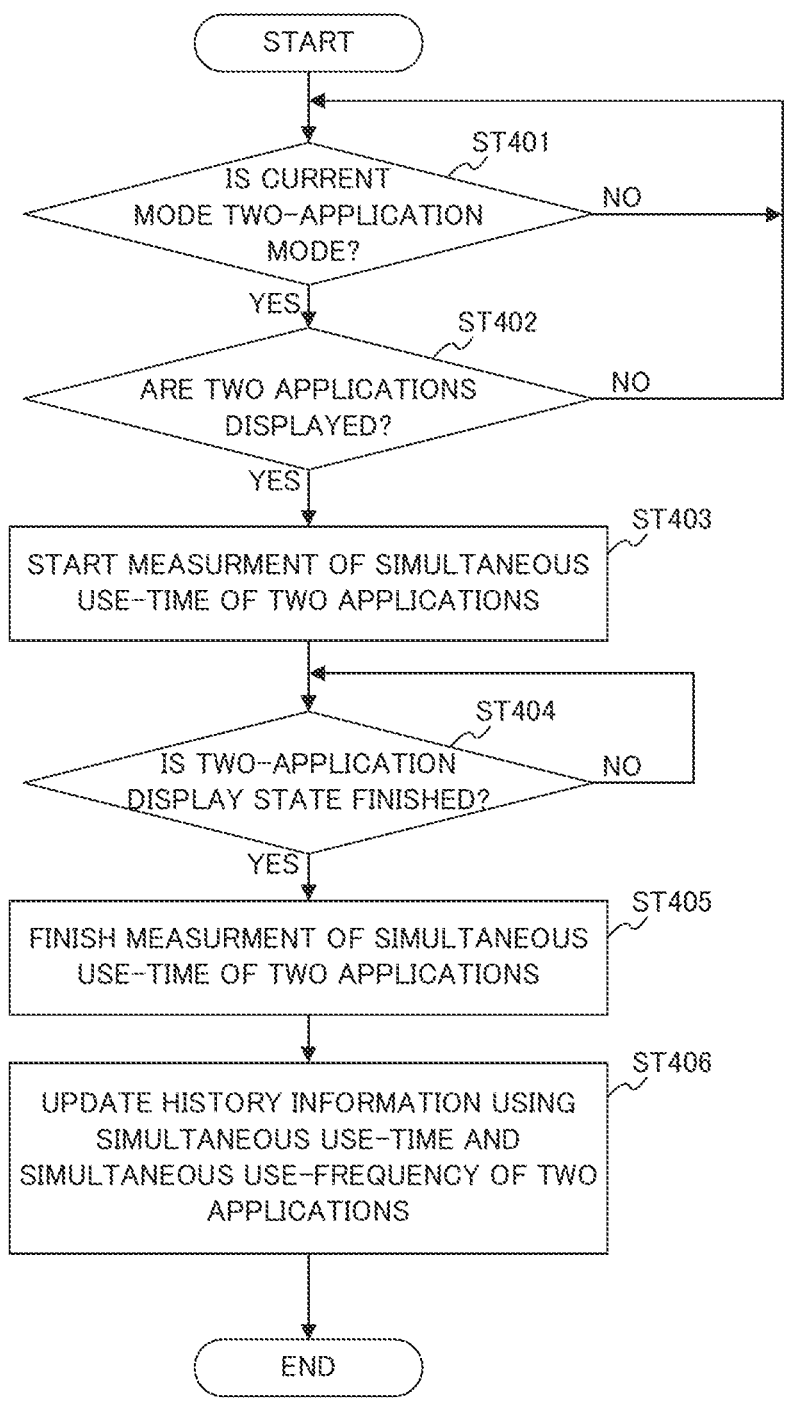
FIG. 8 is a flowchart illustrating a procedure of generating history information of applications in the information processing apparatus according to Embodiment 2 of the present invention.

Next, a procedure of generating history information of applications in information processing apparatus 300 described above will be described with reference to FIG. 8. In step (hereinafter, simply referred to as "ST") 401, application management section 302 determines whether the screen mode is the two-application mode. If the screen mode is the two-application mode (YES in ST401), application management section 302 goes to ST402, and if the screen mode is not the two-application mode (NO in ST401), the procedure returns to ST401.

In ST402, application management section 302 determines whether or not two applications are displayed in the two-application mode. If two applications are displayed in the two-application mode (YES in ST402), application management section 302 goes to ST403, and if two applications are not displayed in the two-application mode (NO in ST402), the procedure returns to ST401.

In ST403, simultaneous use information obtaining section 303 starts measurement of a simultaneous use-time of two applications. Further, in ST404, application management section 302 determines whether or not the two-application display state is finished. If the two-application display state is finished (YES in ST404), application management section 302 goes to ST405, and if the two-application display state is not finished (NO in ST404), the procedure returns to ST404.

In ST405, simultaneous use information obtaining section 303 finishes the measurement of the simultaneous use time of two applications. Further, in ST406, simultaneous use history storage section 304 updates the history information using the simultaneous use-time measured by simultaneous use information obtaining section 303 and the simultaneous use-frequency of the applications, and finishes the procedure of generating history information.

<History Information>

FIG. 9 is a diagram illustrating an example of history information included in simultaneous use history storage section 304 shown in FIG. 7. In the history information as shown in FIG. 9, with respect to the combination of applications that are simultaneously used by the user (applications A to D), the simultaneous use-time and the simultaneous use-frequency are managed by a table.

As a specific updating method of the history information, for example, the time when application A and application B are simultaneously used is set to 5 minutes. Here, in history updating of application A and application B, because the previous accumulated simultaneous use-time of application A and application B is one hour and the simultaneous use-frequency is four, the accumulated simultaneous use-time is updated to one hour and five minutes and the simultaneous use-frequency is updated to five times.

Here, when the simultaneous use-time is several seconds, which is very short, it may be considered that the user mistakenly starts the application. Thus, when the simultaneous use-time is shorter than a predetermined time, simultaneous use history storage section 304 does not update the simultaneous use-frequency.

<Simultaneous Use Application List Generation Procedure>

Next, a procedure of generating a simultaneous use application list in information processing apparatus 300 described above will be described with reference to FIG. 10. In ST501, application management section 302 determines whether or not the application is started. If the application is started (YES in ST501), application management section 302 goes to ST502, and if the application is not started (NO in ST501), the procedure goes to ST504.

In ST502, application management section 302 determines whether the started application is started from the simultaneous use application list. If the started application is started from the simultaneous use application list (YES in ST502), application management section 302 returns to ST501, and if the started application is not started from the simultaneous use application list (NO in ST502), the procedure goes to step ST503.

In ST503, shape determining section 305 determines whether the shape of information processing apparatus 300 is the two-screen state. If the shape is the two-screen state (YES in ST503), shape determining section 305 goes to ST506, and if the shape is not the two-screen state (NO in ST503), the procedure goes to ST504.

In ST504, shape determining section 305 determines whether or not the shape of information processing apparatus 300 is changed to the two-screen state. If the shape is changed to the two-screen state (YES in ST504), shape determining section 305 goes to ST505, and if the shape is not changed to the two-screen state (NO in ST504), the procedure returns to ST501.

In ST505, application management section 302 determines whether or not there is an application that is currently in operation. If there is the application that is currently in operation (YES in ST505), application management section 302 goes to ST506, and if there is no application that is currently in operation (NO in ST505), the procedure returns to ST501.

Figure 11:
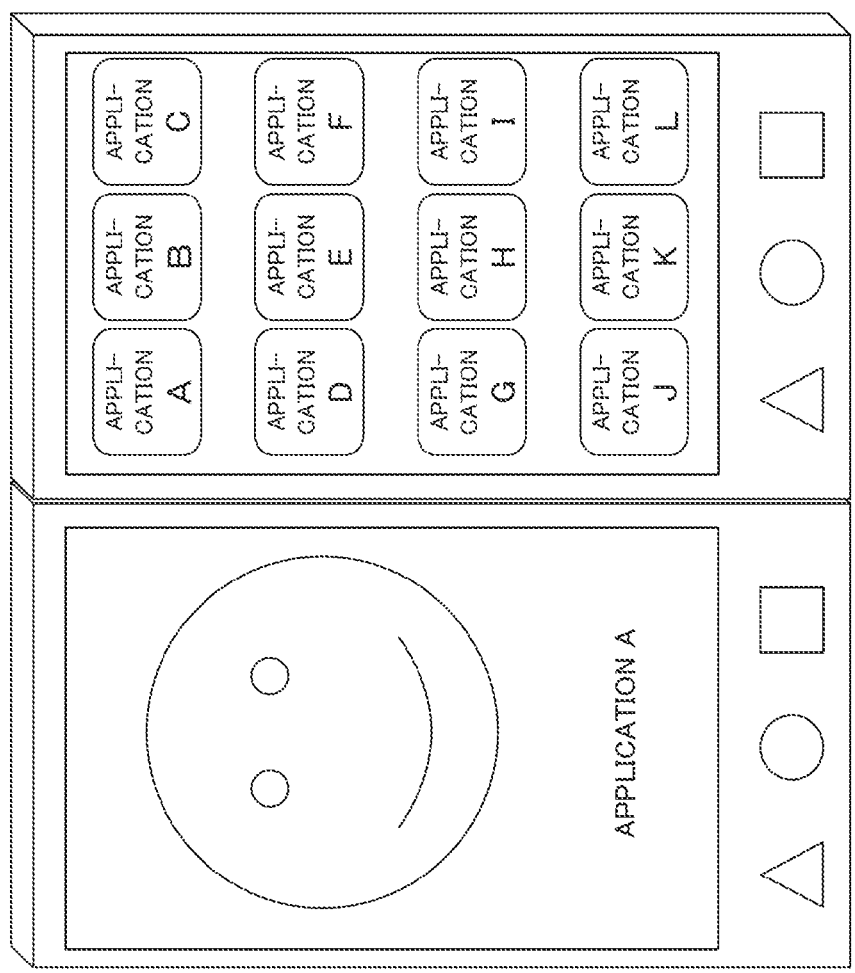
FIG. 11 is a diagram illustrating how a simultaneous use application list is displayed.

In ST506, simultaneous use application list generating section 306 generates information indicating a list of applications with high simultaneous use-frequency with respect to the application that is currently in operation, on the basis of the history information in simultaneous use history storage section 304. Further, in ST507, display control section 307 displays the simultaneous use application list on display section 308 (see FIG. 11), and finishes the procedure of generating a simultaneous use application list.

In this way, when the first application is started in the two-screen state, information processing apparatus 300 displays the started first application on one screen, and displays a list of applications with high simultaneous use-frequency with respect to the first application on the other screen. Further, when the shape is changed from the one-screen state to the two-screen state, information processing apparatus 300 starts the first application to be displayed on one screen, and displays a list of applications with high simultaneous use-frequency with respect to the first application on the other screen. Thus, the user can easily select a second application to be simultaneously used with the first application from the other screen.

Here, the list of applications with high simultaneous use-frequency generated by simultaneous use application list generating section 306 may be considered to be arranged in a descending order of simultaneous use-times, simultaneous use frequencies or use frequencies based on combinations of the simultaneous use-times and the simultaneous use frequencies. Here, in the use frequencies based on the combinations of the simultaneous use-times and the simultaneous use frequencies, for example, it may be defined that as the simultaneous use-time is longer and the simultaneous use-frequency is higher, the use-frequency of the application becomes higher. Specifically, for example, it may be considered that the use-frequency may be defined by (weighting of time×simultaneous use-time)+(weighting of frequency×simultaneous use-frequency).

In this way, in the present embodiment, the combination of the applications that are simultaneously used and the use-frequency thereof is retained as the history information. Further, in the present embodiment, when the first application is started in the two-screen state, the list of applications with high simultaneous use-frequency with respect to the started application is generated and displayed on the basis of the retained history information. Thus, in the present embodiment, the user can easily select the second application. As a result, in the present embodiment, the user can start only a desired application, and thereby, appropriate power consumption and memory usage can be achieved.

Further, in the present embodiment, when the shape is changed from the one-screen state to the two-screen state, the started application is displayed on one screen, and the list of applications with high simultaneous use-frequency with respect to the application is displayed on the other screen. Thus, in the present embodiment, the user can easily select the second application.

Embodiment 3

In Embodiment 2, a description has been given of a case where, when the first application is started, the simultaneous use application list is generated on the basis of the history information on applications that are simultaneously used. However, in Embodiment 3, a case where a user associates simultaneous use applications will be described.

<Configuration of Information Processing Apparatus 600>

Figure 12:
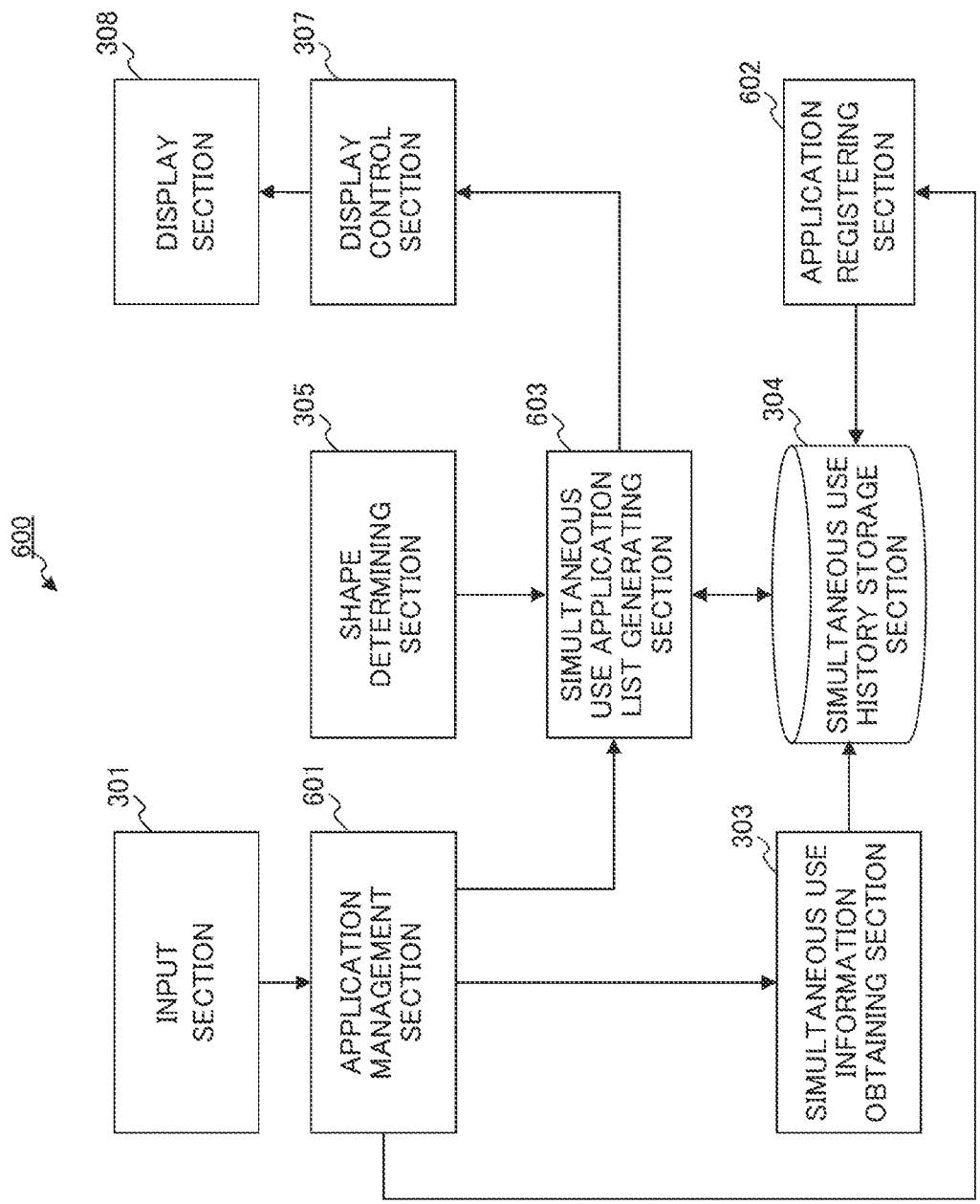
FIG. 12 is a block diagram illustrating a configuration of an information processing apparatus according to Embodiment 3 of the present invention.

FIG. 12 is a block diagram illustrating a configuration of information processing apparatus 600 according to Embodiment 3 of the invention. FIG. 12 is different from FIG. 7 in that application management section 302 is changed to application management section 601, simultaneous use application list generating section 306 is changed to simultaneous use application list generating section 603, and application registering section 602 is added.

Application management section 601 controls start and end of an application by input information output from input section 301, and outputs start information and end information on the application to simultaneous use information obtaining section 303 and simultaneous use application list generating section 603. Further, application management section 601 determines the state of the task is currently in operation and the screen mode, and outputs the determination result to simultaneous use application list generating section 603. Further, when the input information output from input section 301 corresponds to a registration instruction for an optional application selected from the simultaneous use application list, application management section 601 outputs information on the application with the registration instruction to application registering section 602.

Application registering section 602 associates the application information output from application management section 601 with the application that is currently in operation to set application registration information obtained from the management section, and stores the application registration information in simultaneous use history storage section 304, separately from the history information.

Simultaneous use application list generating section 603 obtains the history information and the application registration information read from simultaneous use history storage section 304, the shape information output from shape determining section 305, and the information output from application management section 601. Further, simultaneous use application list generating section 603 generates information indicating a list of applications that are simultaneously used with the first application that is currently in operation and list information on applications registered by the user, on the basis of the obtained all information. Further, simultaneous use application list generating section 603 outputs the generated application list information to display control section 307.

<Application Registration Procedure>

Figure 13:
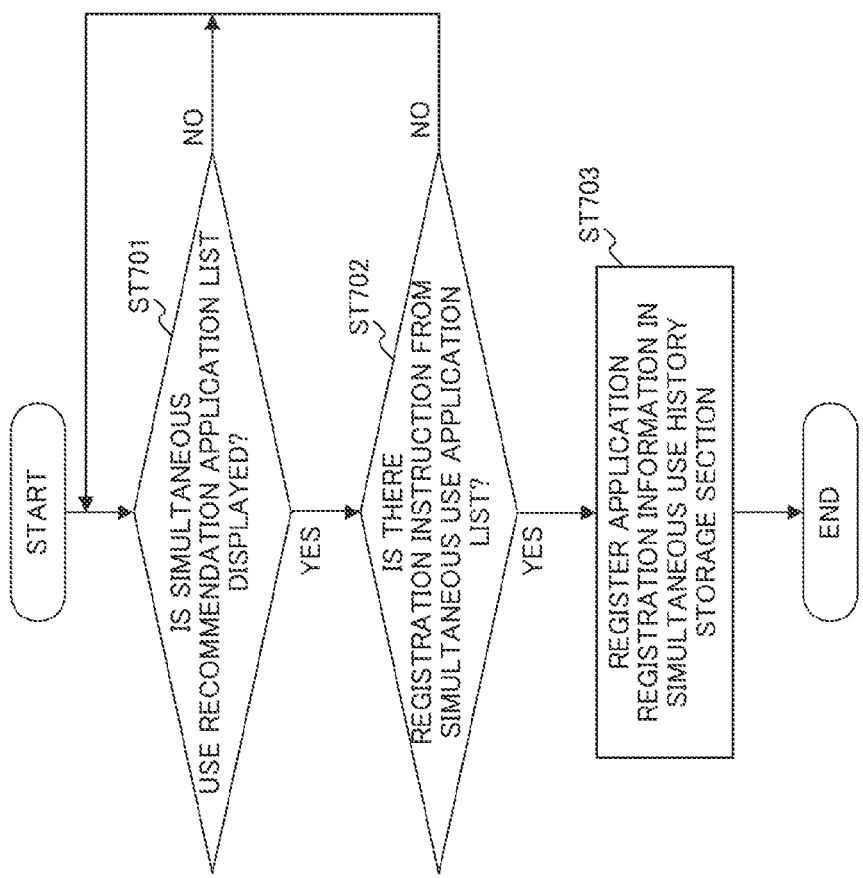
FIG. 13 is a flowchart illustrating an application registration procedure in the information processing apparatus according to Embodiment 3 of the present invention.

Next, an application registration procedure in information processing apparatus 600 described above will be described with reference to FIG. 13. In ST701, application management section 601 determines whether a simultaneous use application list is displayed. If the simultaneous use application list is displayed (YES in ST701), application management section 601 goes to ST702, and if the simultaneous use application list is not displayed (NO in ST701), the procedure returns to ST701.

In ST702, application registering section 602 determines whether or not there is a registration instruction of an application selected from the simultaneous use application list. If there is the application registration instruction (YES in ST702), application registering section 602 goes to ST703, and if there is no application registration instruction (NO in ST702), the procedure returns to ST701.

In ST703, application registering section 602 registers application registration information obtained by associating the application with the registration instruction and the application that is currently in operation in simultaneous use history storage section 304, and finishes the application registration procedure.

Figure 14B:
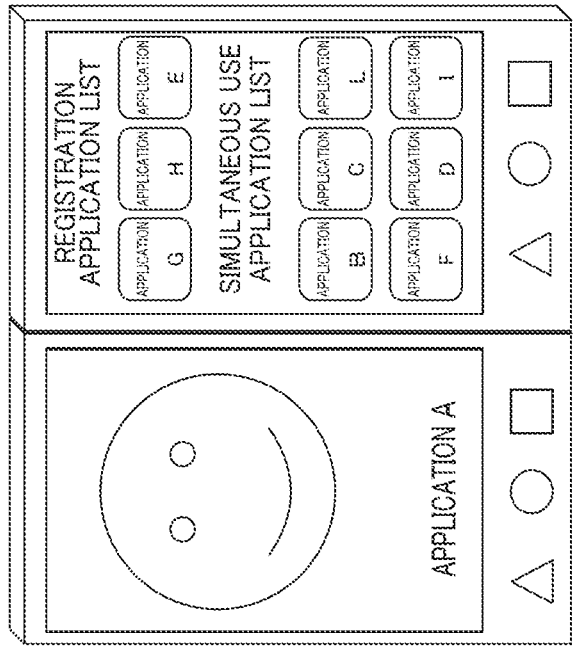
FIGS. 14A and 14B are diagrams illustrating how an application is registered.
Figure 14A:
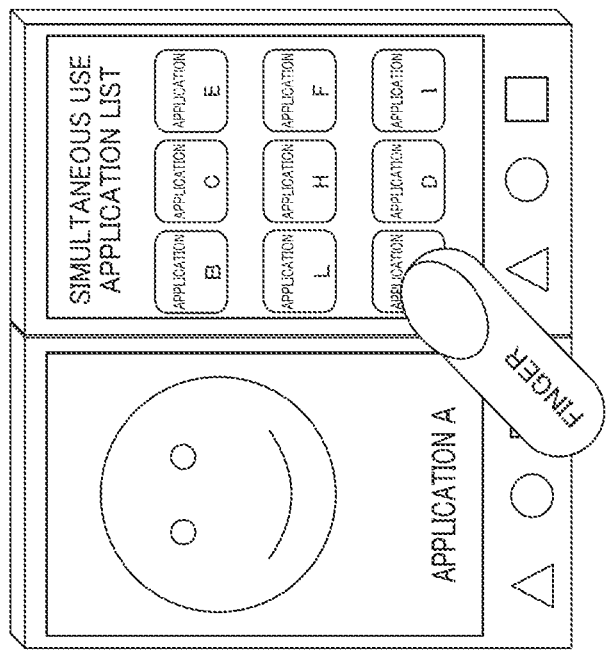

FIGS. 14A and 14B are diagrams illustrating an example of application registration. As shown in FIG. 14A, a user selects an optional application from the simultaneous use application list while application A is started, and inputs a registration instruction of the selected application. As a result, as shown in FIG. 14B, registered applications (in the figure, applications G, H and E) while application A is started are displayed preferentially over the simultaneous use application list.

In this way, in the present embodiment, the user selects an arbitrary application from the simultaneous use application list, while the first application is in operation, sets application registration information by associating the selected application with the application that is currently in operation, and displays the set registered application. Thus, in Embodiment 3, the user can easily select the second application simultaneously used with the first application.

In the present embodiment, a case where the user selects an application on the basis of the history information has been described, but the user may select an optional application from applications that are not included in the history information, among applications installed in information processing apparatus 600.

Embodiment 4

In Embodiment 2, a case where the history information in information processing apparatus 300 is updated has been described, but in Embodiment 4 of the invention, a case where a server accumulates combinations of applications that are simultaneously used in a plurality of information processing apparatuses will be described.

<Configuration of Information Processing Apparatus 800>

Figure 15:
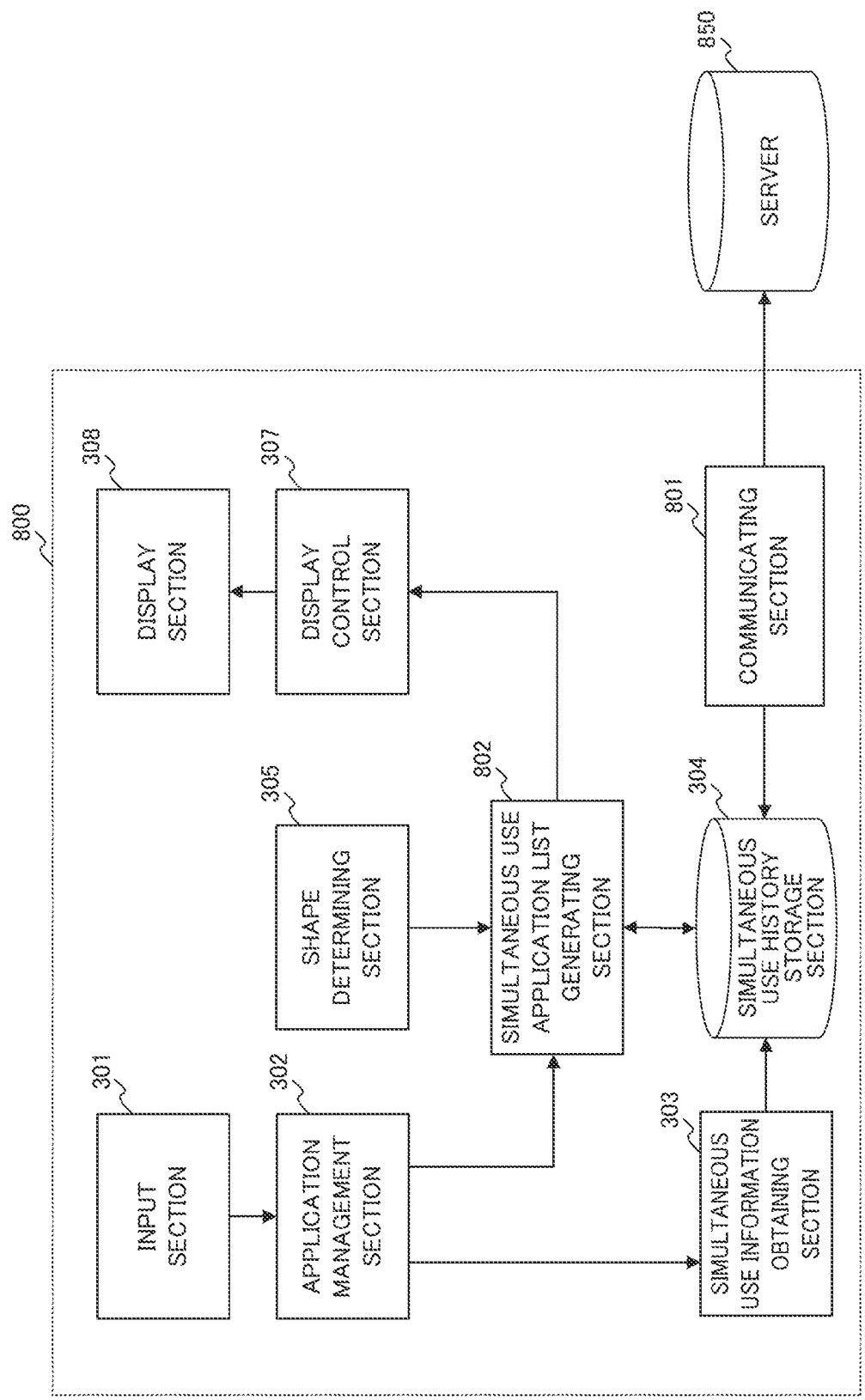
FIG. 15 is a block diagram illustrating a configuration of an information processing apparatus according to Embodiment 4 of the present invention.

FIG. 15 is a block diagram illustrating a configuration of information processing apparatus 800 according to Embodiment 4 of the invention. FIG. 15 is different from FIG. 7 in that simultaneous use application list generating section 306 is changed to simultaneous use application list generating section 802, and communicating section 801 is added.

Communicating section 801 reads the history information stored in simultaneous use history storage section 304, and transmits the read history information to server 850. Further, communicating section 801 obtains a simultaneous use recommendation application transmitted from server 850, and stores the result in simultaneous use history storage section 304.

Simultaneous use application list generating section 802 obtains the history information and the simultaneous use recommendation application read from simultaneous use history storage section 304, the shape information output from shape determining section 305, and the information output from application management section 302. Further, simultaneous use application list generating section 802 generates information indicating a list of applications that are simultaneously used with the first application that is currently in operation and list information on the simultaneous use recommendation applications, on the basis of the obtained information. Further, simultaneous use application list generating section 802 outputs the generated application list information to display control section 307.

Server 850 analyzes the history information transmitted from a plurality of information processing apparatuses, and determines applications with high simultaneous use-frequency for each application as the simultaneous use recommendation applications. Server 850 transmits the determined simultaneous use recommendation applications to the information processing apparatuses. Thus, server 850 can easily realize simultaneous use of two applications even for a user who does not know the combination of two applications that are simultaneously used by many users.

<History Information Transmission Procedure to Server>

Figure 16:
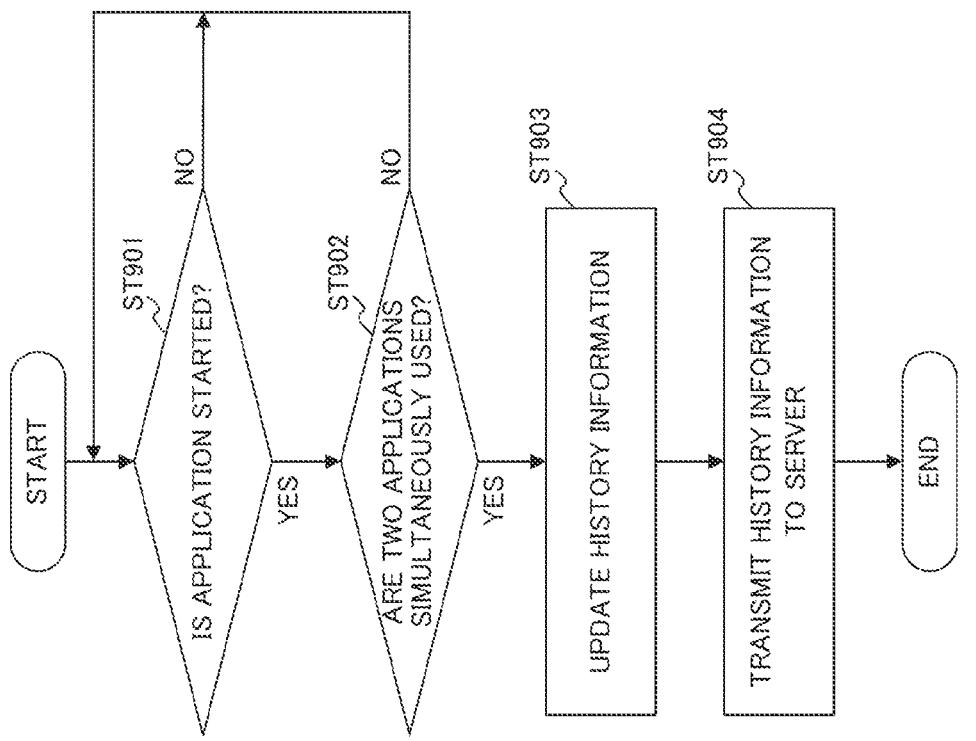
FIG. 16 is a flowchart illustrating a procedure of transmitting history information to a server in the information processing apparatus according to Embodiment 4 of the present invention.

Next, a history information transmission procedure to server 850 in information processing apparatus 800 described above will be described with reference to FIG. 16. In ST901, application management section 302 determines whether an application is started. If the application is started (YES in ST901), application management section 302 goes to ST902, and if the application is not started (NO in ST901), the procedure returns to ST901.

In ST902, application management section 302 determines whether or not two applications are simultaneously used. If two applications are simultaneously used (YES in ST902), application management section 302 goes to ST903, and if two applications are not simultaneously used (NO in ST902), the procedure returns to ST901.

In ST903, simultaneous use information obtaining section 303 measures the simultaneous use-time of two applications, and causes simultaneous use history storage section 304 to update the history information using the simultaneous use-time and simultaneous use-frequency.

In ST904, communicating section 801 reads the history information from simultaneous use history storage section 304, and transmits the read history information to server 850.

<Simultaneous Use Recommendation Application List Generation Procedure>

Figure 10:
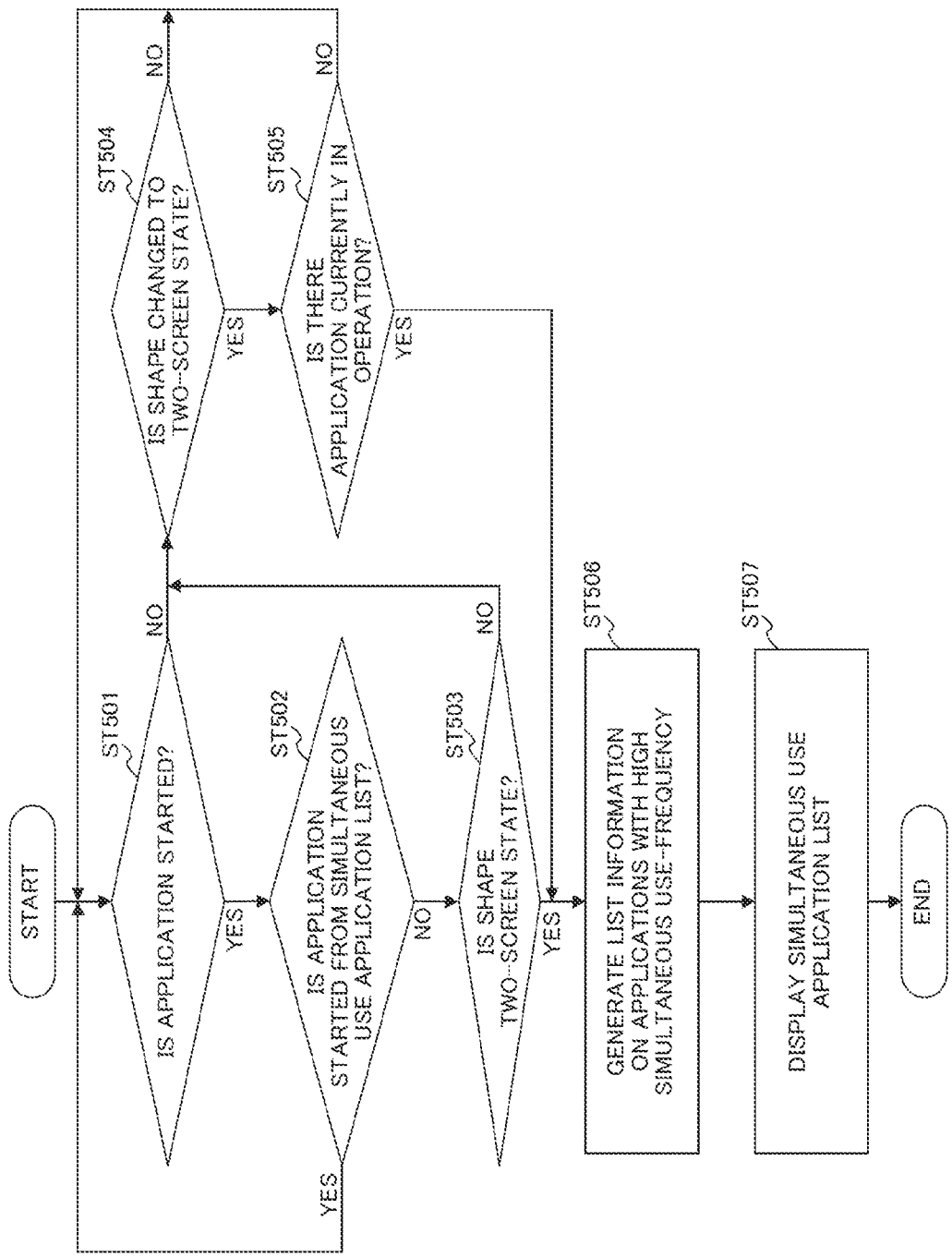
FIG. 10 is a flowchart illustrating a procedure of generating a simultaneous use application list in the information processing apparatus according to Embodiment 2 of the present invention.
Figure 17:
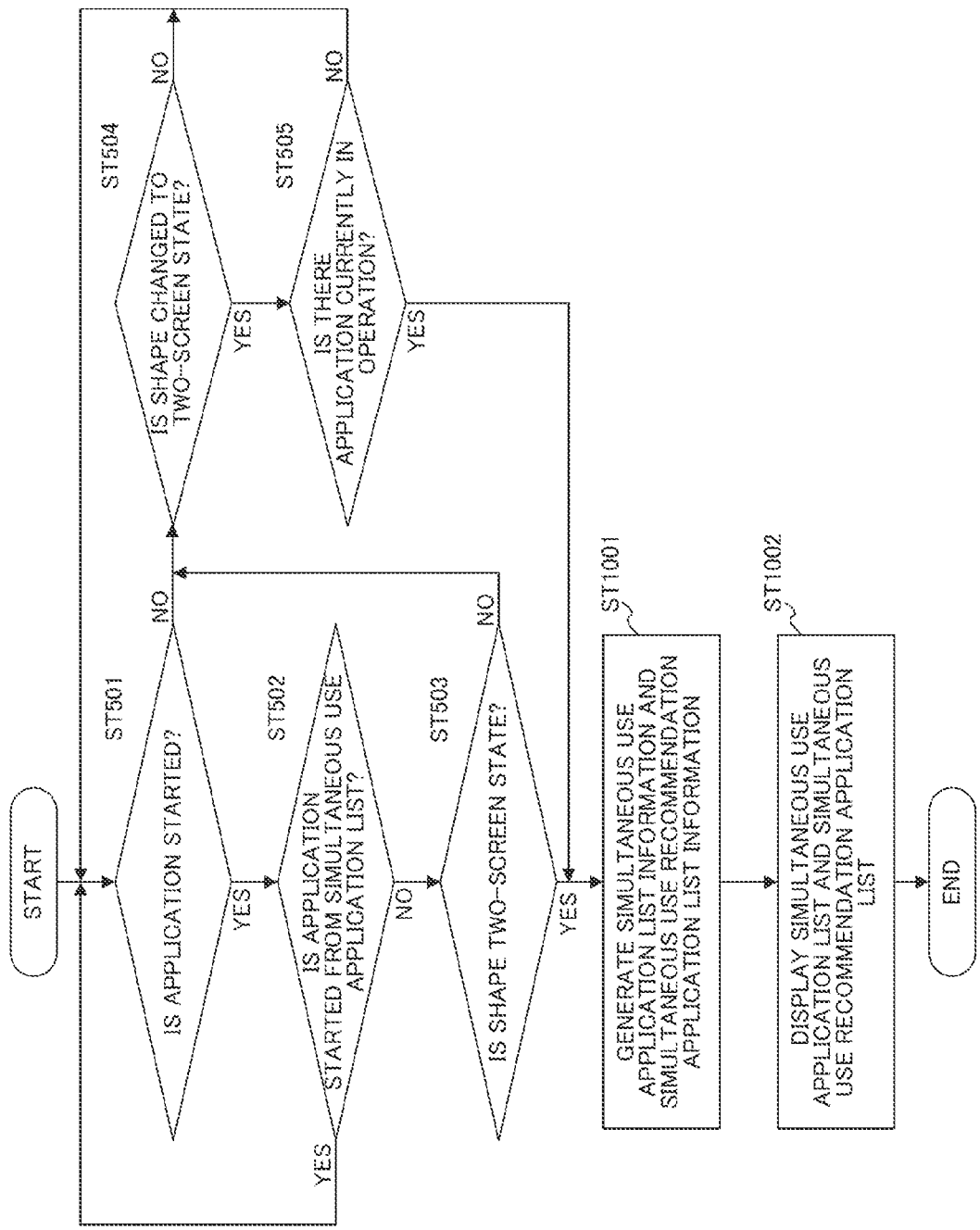
FIG. 17 is a flowchart illustrating a procedure of generating a simultaneous use recommendation application list in the information processing apparatus according to Embodiment 4 of the present invention.

Next, a procedure of generating a simultaneous use recommendation application list in information processing apparatus 800 described above will be described with reference to FIG. 17. Here, in FIG. 17, the same reference numerals as in FIG. 10 are given to the procedure common to FIG. 10, and repetitive description will be omitted.

In ST1001, simultaneous use application list generating section 802 generates simultaneous use recommendation application list information on the basis of the simultaneous use recommendation applications read from simultaneous use history storage section 304. Further, simultaneous use application list generating section 802 generates simultaneous use application list information on the basis of the history information read from simultaneous use history storage section 304.

In ST1002, display control section 307 displays the simultaneous use recommendation application list and the simultaneous use application list in display section 308, and finishes the simultaneous use recommendation application list generation procedure.

Figure 18A:
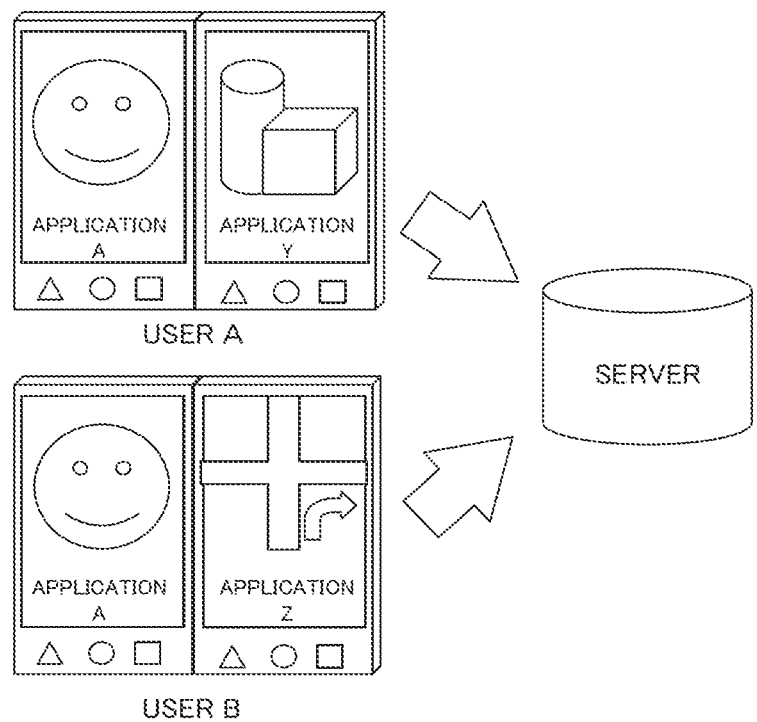
FIGS. 18A and 18B are diagrams respectively illustrating how history information is transmitted to a server from a plurality of users and how a simultaneous use recommendation application is notified from the server.
Figure 18B:
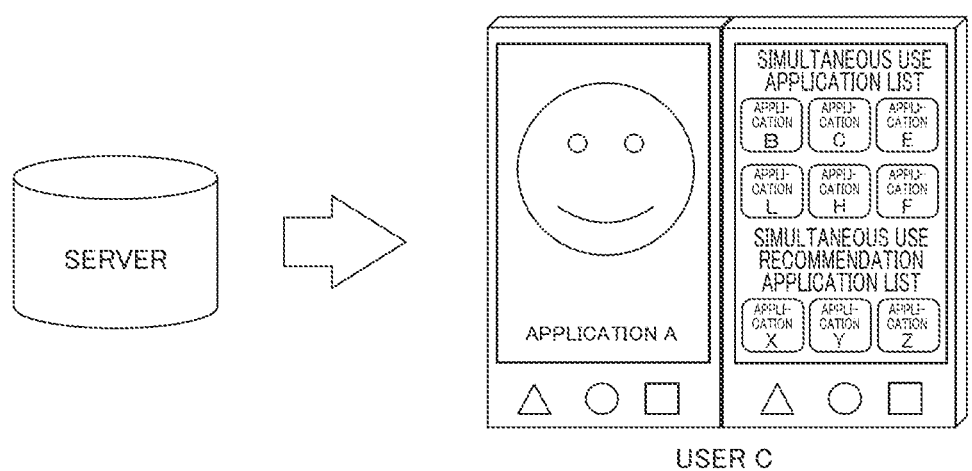

FIGS. 18A and 18B are diagrams illustrating an example in which history information is transmitted to a server from a plurality of users and an example in which a simultaneous use recommendation application is notified from the server. In FIG. 18A, user A simultaneously uses application A and application Y, user B simultaneously uses application A and application Z, and user A and user B transmit history information to the server.

The server determines application X, application Y and application Z as applications that are recommended to be simultaneously used with application A on the basis of the history information transmitted from a plurality of users including user A and user B, and notifies user C of the result.

As shown in FIG. 18B, when application A is started, user C displays a simultaneous use application list and simultaneous use recommendation applications X to Z notified from the server.

In this way, in the present embodiment, the combination of applications that are simultaneously used and use-frequency thereof are transmitted to the server from the information processing apparatus as the history information. Further, the server of the present embodiment determines simultaneous use recommendation applications with high simultaneous use-frequency for each application on the basis of the history information transmitted from a plurality of information processing apparatuses. Further, the information processing apparatus of the present embodiment generates and displays a list of the simultaneous use recommendation applications notified from the server when the first application is started. Thus, in the present embodiment, it is possible to easily realize a simultaneous use of two applications that are not expected by a user.

In the present embodiment, a case where a simultaneous use recommendation application that the user wants to select is not installed in information processing apparatus 800 may be considered. In this case, by immediately downloading the application from server 850, the user can easily use the simultaneous use recommendation application.

Further, in the present embodiment, the example in which information processing apparatus 800 transmits the history information to server 850 has been described, but the invention is not limited thereto. For example, information processing apparatus 800 may transmit combination information on two applications to server 850.

Hereinbefore, the description about the embodiments described above is only an example, and thus, various modifications can be made. For example, the operation of the above-described information processing apparatus 100 may be realized by software in cooperation with hardware.

Further, a CPU and a storage such as a memory or a hard disk in which a program for functions corresponding to the function blocks described in the embodiments is stored are provided as a hardware configuration. The functions of the function blocks may be realized by reading and executing a program by a CPU.

Further, in the embodiments described above, the example in which touch panels 40 and 50 are arranged horizontally in a row and display contents has been described, but the invention is not limited to this example. For example, the invention may also be applied to a case where touch panels 40 and 50 are arranged vertically in a row and display contents.

Further, in the embodiments described above, a description has been given with the example in which two-touch panel terminal provided with two touch panels is assumed as the information processing apparatus. However, the invention is not limited to this example. For example, three or more touch panels may be provided, or one touch panel may be divided into a plurality of regions and configured to start different applications in the respective regions.

The disclosure of Japanese Patent Application No. 2012-119930, filed on May 25, 2012, including the specification, drawings and abstract, is incorporated herein by reference in its entirety.

INDUSTRIAL APPLICABILITY

The information processing apparatus, the information processing method and the information processing program according to the present invention are applicable to a smart phone, a tablet or the like.

REFERENCE SIGNS LIST 10, 20 Housing
30 Hinge
40, 50 Touch panel
100, 300, 600, 800 Information processing apparatus
101 Sensor
102 Timer
103, 305 Shape determining section
104 Apparatus state management section
105 Mode control section
106, 307 Display control section
107, 308 Display section
301 Input section
302, 601 Application management section
303 Simultaneous use information obtaining section
304 Simultaneous use history storage section
306, 603, 802 Simultaneous use application list generating section
602 Application registering section
801 Communicating section
850 Server

The invention claimed is:

1. An information processing apparatus that includes a first housing having a first screen and a second housing having a second screen and that is allowed to switch between a first screen state where the rear surfaces of the first screen and the second screen are put together while facing each other and that performs displaying by a single screen mode capable of displaying one application on one of the first screen and the second screen and a second screen state where the first screen and the second screen are spread and that performs displaying by a full-screen mode capable of displaying one application on the entirely of the first screen and the second screen or a two-application mode capable of displaying different applications on the respectively of the first screen and the second screen by changing arrangement of the first housing and the second housing, the first housing and the second housing being rotatably connected to each other, the information processing apparatus comprising:
   a sensor that detects an angle formed by the first screen and the second screen;
   a shape determining section that determines a shape of the information processing apparatus based on the detected angle and determines whether or not a fold-and-return operation is performed, the fold-and-return operation being an operation in which a first angle formed by the first screen and the second screen in the second screen state is changed to a predetermined second angle and then returned to the first angle within a predetermined time;
   a mode control section that switches a display method of the full-screen mode or the two-application mode to another display method when the fold-and-return operation is performed;
   a display section that performs a display operation in the first screen and the second screen using the display method resulting from the switching performed by the mode control section;
   a storage section that stores a combination of a plurality of applications which are simultaneously used, and frequency of use of the combination, as history information; and
   a list generating section that generates, when a first application is started on the first screen, list information on a second application having a high simultaneous use-frequency with respect to the first application, based on the history information, wherein
   the display section displays the generated list information on the second screen.

2. The information processing apparatus according to claim 1, wherein the mode control section switches, when a fold-and-return operation in which the first angle is changed to one or more of a previously set plurality of angles and then returned to the first angle is performed, the display method to a display method in association with the one or more of the plurality of angles.

3. An information processing apparatus that includes a first housing having a first screen and a second housing having a second screen and that is allowed to switch between a first screen state and a second screen state by changing arrangement of the first housing and the second housing, the first housing and the second housing being rotatably connected to each other, the information processing apparatus comprising:
   a sensor that detects an angle formed by the first screen and the second screen;
   a shape determining section that determines a shape of the information processing apparatus based on the detected angle and determines whether or not a fold-and-return operation is performed, the fold-and-return operation being an operation in which a first angle formed by the first screen and the second screen in the second screen state is changed to a predetermined second angle and then returned to the first angle within a predetermined time;
   a mode control section that switches a display method for performing a display operation in the first screen and the second screen to another display method when the fold-and-return operation is performed;

a display section that performs a display operation in the first screen and the second screen using the display method resulting from the switching performed by the mode control section;

a storage section that stores a combination of a plurality of applications which are simultaneously used, and frequency of use of the combination, as history information; and a list generating section that generates, when a first application is started on the first screen, list information on a second application having a high simultaneous use-frequency with respect to the first application, based on the history information, wherein the display section displays the generated list information on the second screen.

4. The information processing apparatus according to claim 3, wherein the frequency is a use-time of the combination, a use-frequency of the combination, or an index based on the use-time and the use-frequency.

5. The information processing apparatus according to claim 3, wherein the list generating section generates the list information in a descending order of the frequencies.

6. The information processing apparatus according to claim 3, wherein:
the display section includes a first display region and a second display region; and
the display section displays an image of the started first application in the first display region, and displays the list information in the second display region.

7. The information processing apparatus according to claim 3, further comprising a registering section that sets registration information in which the first application and an optional third application are associated with each other, wherein
the list generating section generates list information on the third application when the first application is started.

8. The information processing apparatus according to claim 3, further comprising a shape determining section that determines either that the information processing apparatus is in the first screen state or that the information processing apparatus is in the second screen state, wherein
the list generating section generates the list information when the information processing apparatus shifts from the first screen state to the second screen state.

9. The information processing apparatus according to claim 3, further comprising a communicating section that transmits the history information to a server apparatus and receives a notification of a fourth application having a high simultaneous use-frequency with respect to the first application from the server apparatus, the fourth application being determined in the server apparatus based on history information transmitted from a plurality of information processing apparatuses, wherein
the list generating section generates list information on the fourth application when the first application is started.

10. An information processing method in an information processing apparatus that includes a first housing having a first screen and a second housing having a second screen and that is allowed to switch between a first screen state where the rear surfaces of the first screen and the second screen are put together while facing each other and that performs displaying by a single screen mode capable of displaying one application on one of the first screen and the second screen and a second screen state where the first screen and the second screen are spread and that performs displaying by a full-screen mode capable of displaying one application on the entirely of the first screen and the second screen or a two-application mode capable of displaying different applications on the respectively of the first screen and the second screen by changing arrangement of the first housing and the second housing, the first housing and the second housing being rotatably connected to each other, the information processing method comprising:
detecting an angle formed by the first screen and the second screen;
determining a shape of the information processing apparatus based on the detected angle and determining whether or not a fold-and-return operation is performed, the fold-and-return operation being an operation in which a first angle formed by the first screen and the second screen in the second screen state is changed to a predetermined second angle and then returned to the first angle within a predetermined time;
switching a display method of the full-screen mode or the two-application mode to another display method when the fold-and-return operation is performed;
performing a display operation in the first screen and the second screen using the display method resulting from the switching;
storing a combination of a plurality of applications which are simultaneously used, and frequency of use of the combination, as history information; and
generating, when a first application is started on the first screen, list information on a second application having a high simultaneous use-frequency with respect to the first application, based on the history information, wherein
displaying the generated list information on the second screen.

11. An information processing program that causes an information processing apparatus to execute processing, the information processing apparatus being an apparatus that includes a first housing having a first screen and a second housing having a second screen and that is allowed to switch between a first screen state where the rear surfaces of the first screen and the second screen are put together while facing each other and that performs displaying by a single screen mode capable of displaying one application on one of the first screen and the second screen and a second screen state where the first screen and the second screen are spread and that performs displaying by a full-screen mode capable of displaying one application on the entirely of the first screen and the second screen or a two-application mode capable of displaying different applications on the respectively of the first screen and the second screen by changing arrangement of the first housing and the second housing, the first housing and the second housing being rotatably connected to each other, the information processing program causing the apparatus to execute the processing comprising:
detecting an angle formed by the first screen and the second screen;
determining a shape of the information processing apparatus based on the detected angle and determining whether or not a fold-and-return operation is performed, the fold-and-return operation being an operation in which a first angle formed by the first screen and the second screen in the second screen state is changed to a predetermined second angle and then returned to the first angle within a predetermined time;
switching a display method of the full-screen mode or the two-application mode to another display method when the fold-and-return operation is performed;

performing a display operation in the first screen and the second screen using the display method resulting from the switching;

storing a combination of a plurality of applications which are simultaneously used, and frequency of use of the combination, as history information; and generating, when a first application is started on the first screen, list information on a second application having a high simultaneous use-frequency with respect to the first application, based on the history information, wherein displaying the generated list information on the second screen.

12. An information processing method in an information processing apparatus that includes a first housing having a first screen and a second housing having a second screen and that is allowed to switch between a first screen state and a second screen state by changing arrangement of the first housing and the second housing, the first housing and the second housing being rotatably connected to each other, the information processing method comprising:

detecting an angle formed by the first screen and the second screen;

determining a shape of the information processing apparatus based on the detected angle and determining whether or not a fold-and-return operation is performed, the fold-and-return operation being an operation in which a first angle formed by the first screen and the second screen in the second screen state is changed to a predetermined second angle and then returned to the first angle within a predetermined time;

switching a display method for performing a display operation in the first screen and the second screen to another display method when the fold-and-return operation is performed;

performing a display operation in the first screen and the second screen using the display method resulting from the switching;

storing a combination of a plurality of applications which are simultaneously used, and frequency of use of the combination, as history information; and generating, when a first application is started on the first screen, list information on a second application having a high simultaneous use-frequency with respect to the first application, based on the history information, wherein displaying the generated list information on the second screen.

13. An information processing program that causes an information processing apparatus to execute processing, the information processing apparatus being an apparatus that includes a first housing having a first screen and a second housing having a second screen and that is allowed to switch between a first screen state and a second screen state by changing arrangement of the first housing and the second housing, the first housing and the second housing being rotatably connected to each other, the information processing program causing the apparatus to execute the processing comprising:

detecting an angle formed by the first screen and the second screen;

determining a shape of the information processing apparatus based on the detected angle and determining whether or not a fold-and-return operation is performed, the fold-and-return operation being an operation in which a first angle formed by the first screen and the second screen in the second screen state is changed to a predetermined second angle and then returned to the first angle within a predetermined time;

switching a display method for performing a display operation in the first screen and the second screen to another display method when the fold-and-return operation is performed;

performing a display operation in the first screen and the second screen using the display method resulting from the switching;

storing a combination of a plurality of applications which are simultaneously used, and frequency of use of the combination, as history information; and generating, when a first application is started on the first screen, list information on a second application having a high simultaneous use-frequency with respect to the first application, based on the history information, wherein displaying the generated list information on the second screen.

\* \* \* \* \*